United States Patent [19]

Lenzotti

[11] Patent Number: 4,958,545
[45] Date of Patent: Sep. 25, 1990

[54] PUNCHING AND SHEARING MACHINE WITH VARIABLE CUTTING ANGLE

[76] Inventor: Eugenio Lenzotti, Via Petrarca 6, 41049 Sassuolo, (Province of Modena), Italy

[21] Appl. No.: 254,746

[22] Filed: Oct. 7, 1988

[30] Foreign Application Priority Data

Oct. 13, 1987 [IT] Italy ................................ 40134 A/87

[51] Int. Cl.$^5$ ........................... B26D 5/12; B26D 7/26
[52] U.S. Cl. ....................................... 83/559; 83/582; 83/620; 83/639.1; 83/693; 83/917
[58] Field of Search ................ 83/620, 639, 640, 641, 83/559, 917, 693, 568, 582

[56] References Cited

U.S. PATENT DOCUMENTS

| | | | |
|---|---|---|---|
| 3,958,482 | 5/1976 | Claesson | 83/620 X |
| 3,996,829 | 12/1976 | Tromponi | 83/559 X |
| 4,129,054 | 12/1978 | Fazis | 83/620 X |
| 4,172,401 | 10/1979 | Terrado Albareda | 83/639 X |
| 4,416,176 | 11/1983 | Forthmann | 83/582 |
| 4,483,227 | 11/1984 | Camisa | 83/559 |
| 4,535,665 | 8/1985 | Fazis | 83/620 X |
| 4,729,273 | 3/1988 | Fazis | 83/620 X |
| 4,771,669 | 9/1988 | Bianchi | 83/559 X |

Primary Examiner—Frank T. Yost
Assistant Examiner—Eugenia A. Jones
Attorney, Agent, or Firm—Guido Modiano; Albert Josif

[57] ABSTRACT

The machine includes a supporting frame for a worktable through which a C-shaped head is vertically movable and is actuated by hydraulic means pivoted on the lower face of the worktable and is guided by a pair of vertical cylindrical and parallel columns, fixed to the worktable, and by a shaped slider arranged below the worktable, the upper wing of the head supporting two blades directed towards the worktable and mounted on two respective first upper sectors which both rotate scissors-like about a vertical axis, the worktable having horizontal lower counter-blades also supported by two second respective lower sectors which rotate about the vertical axis, there being means for connecting the first upper sectors and the second lower sectors during rotation and means for positioning and locking them once their position is reached, the head being furthermore controlled by adjustable elastic elements for adjusting the maximum value of force applicable to the first upper blades according to the thickness and to the mechanical resistance of the material being processed.

16 Claims, 4 Drawing Sheets

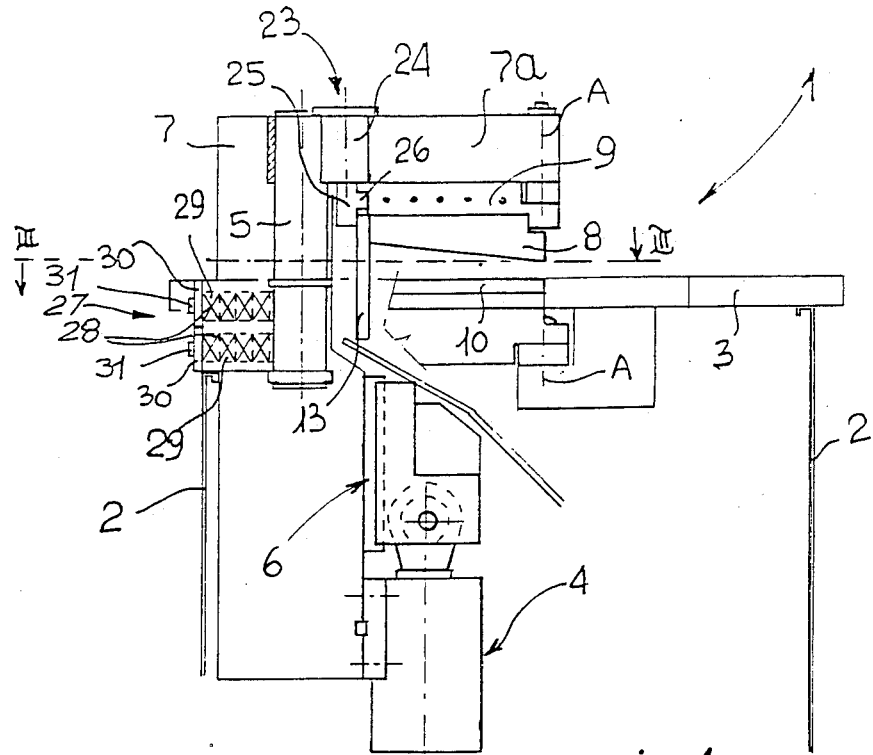
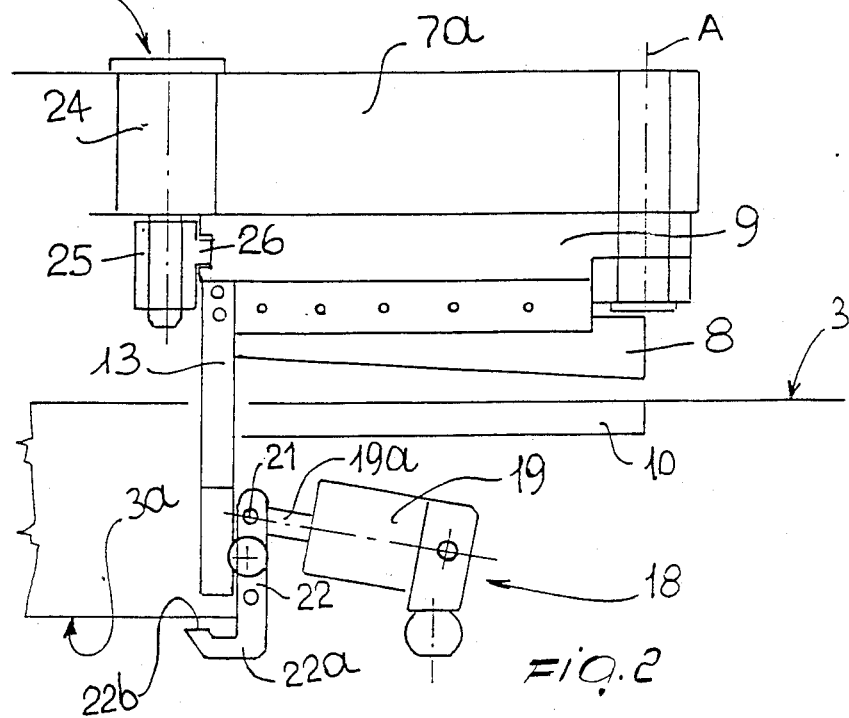

PUNCHING AND SHEARING MACHINE WITH VARIABLE CUTTING ANGLE

BACKGROUND OF THE INVENTION

The present invention relates to a punching and shearing machine with variable cutting angle.

Punching and shearing machines are known having a structure essentially consisting of a box-like supporting frame. The actuation elements of the shearing parts are coupled to the frame so as to provide a set pivoting point for a good operation of the machines. For some workings these machines can furthermore be provided with a group of blades (upper and lower ones) to vary the cutting angle as required. The blades are mounted on supports rotating relatively to one another along arcs of circles.

Finally, all shearing and punching machines share the common problem of defining the applicable shearing force and of keeping constant the required play between the upper blades and the lower blades, the extent of said play being always very limited and, indicatively, in any case of the order of tenths or hundredths of a millimeter.

Known machines have considerable disadvantages as to their general construction: in fact they must necessarily be completely supported by the above described box-like structures, thus making maintenance and/or general and partial disassembly operations extremely complicated and troublesome.

These known machines furthermore have mostly manually actuated devices for determining the applicable forces and for adjusting the play between the blades, their precision therefore depending on the experience of their operator.

Finally, the devices for varying the cutting angle are constructively very complicated and are not easy to operate.

SUMMARY OF THE INVENTION

The aim of the present invention is to overcome the disadvantages of the known machines by providing a punching and shearing machine with variable cutting angle having a simple construction and being easy in maintenance, and which at the same time allows to define in a practically automatic manner the value of the forces applicable to the blades for the various punching and/or cutting operations and of the required micrometric plays according to the thicknesses of the materials being processed, and which finally allows to vary the cutting angle in a continuous manner and with a structure which is simple in concept but safe and reliable in operation.

This aim is achieved by a punching and shearing machine with variable cutting angle, comprising a frame supporting a worktable, characterized in that it further comprises a head moving substantially vertically with respect to the horizontal surface of said worktable and actuated by hydraulic means associated to the lower side of said worktable, said head being guided by guide means associated to said worktable, said head being substantially C-shaped and having at least one first blade, said head being controlled by adjustable elastic means for regulating the maximum value of shear strength for said at least one first blade depending on the thickness of the material to be worked, said at least one second blade being counterposed to said at least one first blade.

BRIEF DESCRIPTION OF THE DRAWINGS

Futher characteristics and advantages of the invention will become apparent from the detailed description of a preferred but not exclusive embodiment of a punching and shearing machine with variable cutting angle, illustrated only by way of non-limitative example in the accompanying drawings, wherein:

FIG. 1 is a schematic and partially sectional side view of the machine;

FIG. 2 is an equally schematic enlarged-scale and partially sectional side view of a detail of the C-shaped head and of the means for connecting said first upper sectors and said second lower ones;

FIGS. 6 and 7 are enlarged partial sectioned views of two different embodiments of the means for regulating the blade force of the machine of FIG. 5.

DESCRIPTION OF THE PREFERRED EMBODIMENTS

Figure 3:
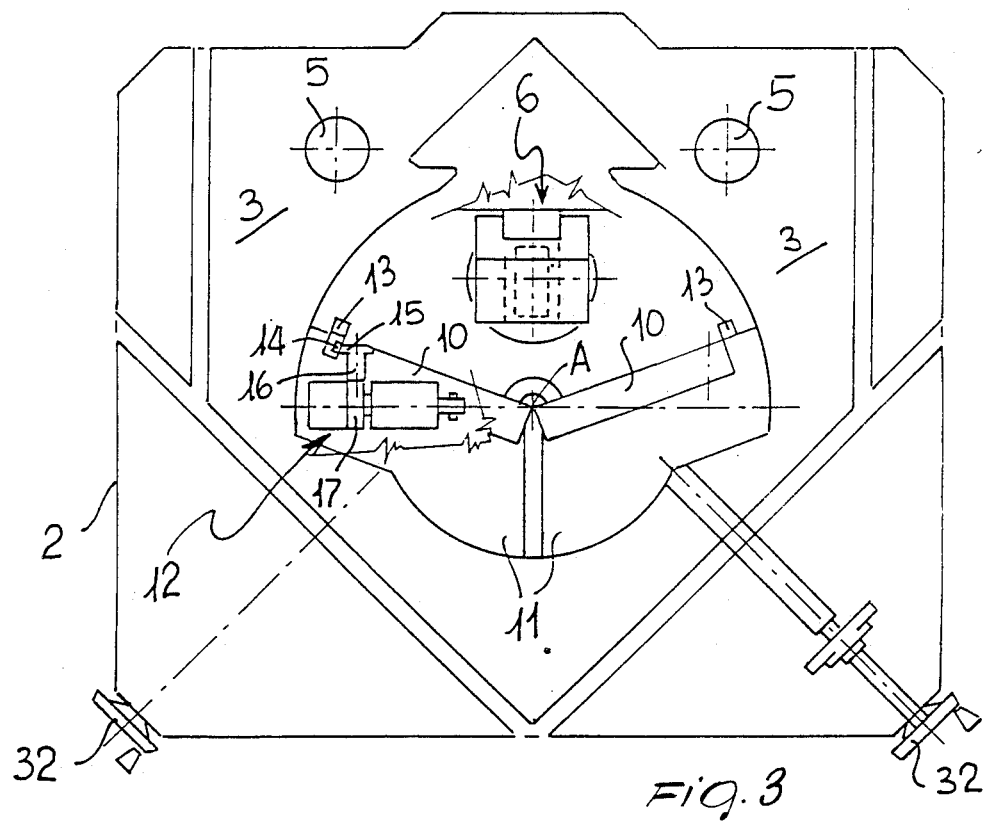
FIG. 3 is a plan view taken along the sectional plane III—III of FIG. 1.
Figure 4:
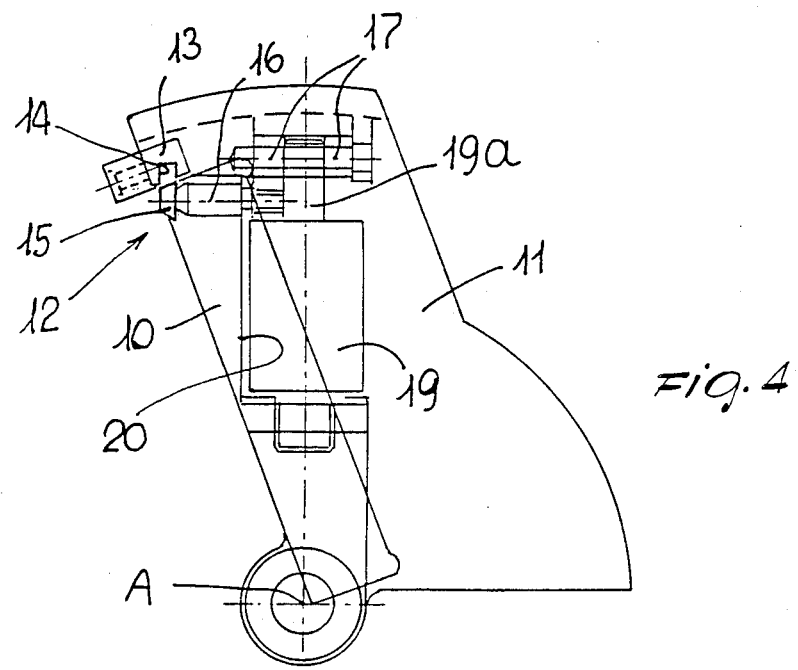
FIG. 4 is a detail top view of said coupling means related to a single second lower sector.

With reference to FIGS. 1–4, the reference numeral 1 generally indicates a punching and shearing machine, with variable cutting angle, of the type comprising a box-like frame 2 for supporting a horizontal worktable 3 through which a C-shaped head 7 is vertically movable. The head 7 is actuated by conventional hydraulic means 4 pivoted on the lower face 3a of said worktable 3 and is guided by at least one pair of vertical cylindrical and mutually parallel columns 5 and by a shaped prismatic slider 6 arranged below said worktable.

The upper extension 7a of said head has two downwardly directed blades 8 which are mounted on two respective first circular upper sectors 9 both of which rotate scissors-like about a vertical axis A.

Also the worktable 3 has lower counter-blades 10 which are arranged horizontally and are supported by two second lower sectors 11 which rotate about said axis A coaxially to said first sectors.

Between said first upper sectors 9 and said second lower ones 11, means 12 connect them only during their rotation; said means consist of at least one pair of vertical prismatic columns 13, each whereof is rigidly coupled to a respective first upper circular sector 9 and has a hollow seat 14, at a level below the worktable 3. A lab 15 engages the seat 14 and protrudes from the perimeter of a cylindrical head 16 rigidly associated with a support 17 which is in turn rigidly associated with means 18 for locking said second lower sectors 11 in position.

Said means 18 comprises at least one pair of hydraulic cylinders 19 which are located below the worktable 3 in related seats 20; at the ends of the stems 19a there are articulations 21 to which the upper ends of respective rockers 22 are coupled, their lower opposite ends 22a being J-shaped, their horizontal portions 22b making contact with the lower face 3a of the worktable 3, in a locked position of the machine.

Also the first upper sectors 9 have means 23 for locking in position once said position is reached, and said means essentially consist of respective vertical cylinders 24 associated with the extension 7a; related stems 25 protrude from said cylinders and support an arc-like flange 26 which is adapted to compress the first upper sectors 9 against the lower face of the extension 7a when the machine is in the working position.

The head 7 has adjustable elastic means 27 for controlling the maximum applicable force and for automatically determining the play between the upper blades 8 and the lower counter-blades 10 according to the thickness of the material being processed and to its mechanical resistance.

Said means consist of a group of helical compression springs 28 arranged horizontally in a pack-like configuration in related seats 29 and having corresponding ends directly in contact with the lower portion of the columns 5 and the opposite ends in contact with respective vertical plates 30 which are micrometrically horizontally movable on related guiding pins 31.

The operation of the invention is as follows: if for example, a sheet of metal has to be shared at an angle, the positions of the first upper sectors 9 and of the second lower sectors 11 are set, said sectors being completely separated from one another in the position of non-rotation. For this purpose, the hydraulic cylinders 19 are therefore first actuated, their stems 19a pushing the supports 17 and, consequently, the heads 16 and the related tabs 15 towards the hollow seats 14 until said tabs enter said seats with a consequent perfect insertion coupling.

After said coupling, the first upper sectors 9 and the second lower ones 11 are rigidly associated with one another.

The handwheels 32 are then acted upon, causing the scissors-like micrometric rotation of said sectors to increase or decrease the value of the angle comprised therebetween.

Once said required value has been obtained, the cylinders 19 are actuated again and cause the return of the heads 16, extracting the tabs 15 from their respective hollow seats 14: in this manner the first upper sectors 9 and the second lower ones 11 are again completely disengaged from one another.

The return action of said cylinders 19 furthermore induces a movement of the rockers 22, which move their horizontal portions 22a to press forcefully on the lower face 3a of the worktable 3, thus locking any further possible rotation of said second lower sectors 11; in turn, the first upper ones 9 are simultaneously locked by the means 23; the arc-like flange 26 supported by the stems 25 of the cylinders 24 compresses, when the latter are actuated, the first upper sectors 9 against the extension 7a, pulling said sectors upwards and locking the configuration obtained thereby.

Once these elements have been thus positioned, the metal sheet to be processed is inserted between the blades 8 and 10; for example, the cut as to be of the maximum depth, at least one edge of said sheet is pushed to abut against one of the columns 13; said column is also usable as fixed reference if the cutting is to continue in a plurality of strokes.

Subsequently, the hydraulic means 4 are actuated, causing the downward return of the head 7 and performing the cutting action; said head is guided, during its motion, by two vertical columns 5 which are slideable in related bushes, not shown in the figures, and by a shaped prismatic slider 6 the position whereof is such as to set both the resultant of the cutting forces generated by the upper extension 7a and the resultant of the moving forces of the hydraulic means 4 substantially onto the same line of action, in opposition to one another, so as to compensate each other; this substantially eliminates any bending moments so harmful in known machines that the worktable 3 thickness must be considerable; the latter, according to the invention, can thus instead be considerably reduced with great savings in construction material and therefore in cost with equal performance.

Said head 7, during the cutting step, is capable of automatically adjusting the play between the upper blades 8 and the lower ones 10; this occurs by presetting the helical compression springs 28 to preset values so that the head 7, under the cutting force, spontaneously recovers the centesimal plays occurring between the columns 5 and the respective accommodation seats, as well as between the hydraulic means 4 and the shaped prismatic slider 6.

Finally, it should be noted that the particular construction of the invention makes it structurally very solid and compact in its dimensions; at the same time it makes the worktable 3 and the box-like frame 2 fully independent, said frame thus having almost exclusively the function of containing the elments and of merely supporting said plane 3, all said elements being associated and rigidly coupled to said plane and only thereto.

This allows to easily intervene thereon, both for ordinary maintenance and for repairs.

In practice it has been observed that the described invention achieves the intended aims.

The invention thus conceived is susceptible to numerous modifications and variations, all of which are within the scope of the inventive concept.

Figure 5:
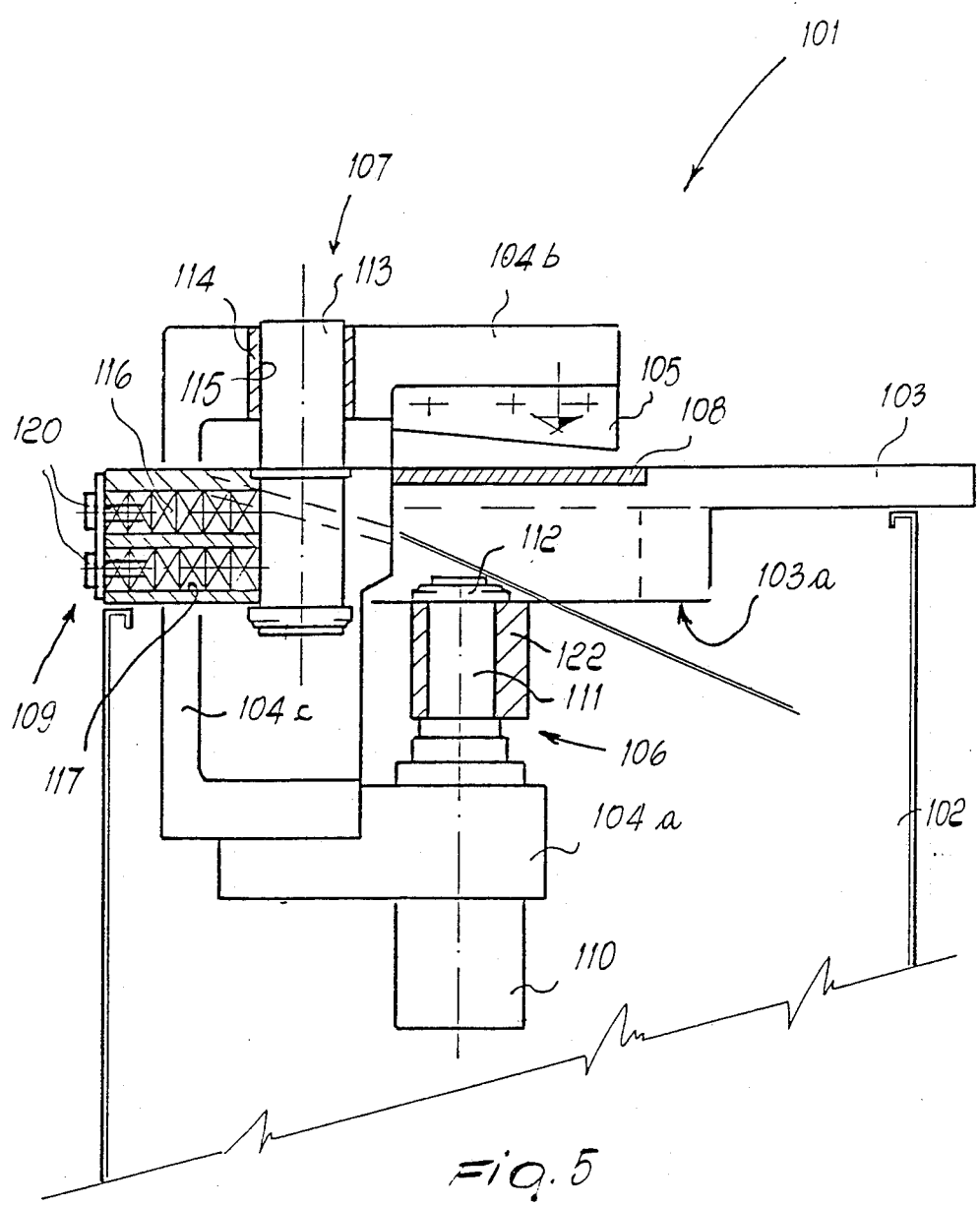
Figure 6:
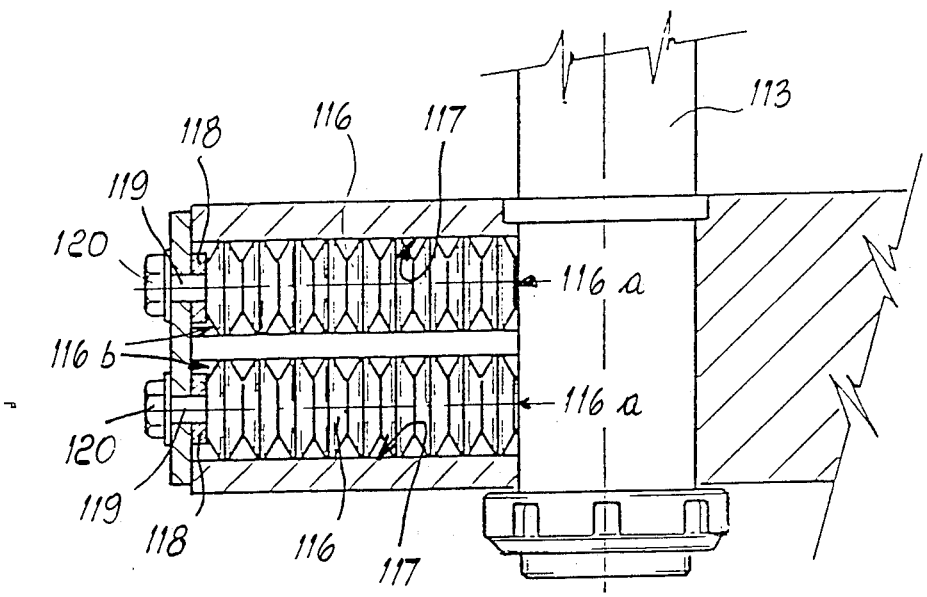
FIG. 6 is a schematic and partially sectioned view of the machine according to a second aspect of the invention.
Figure 7:
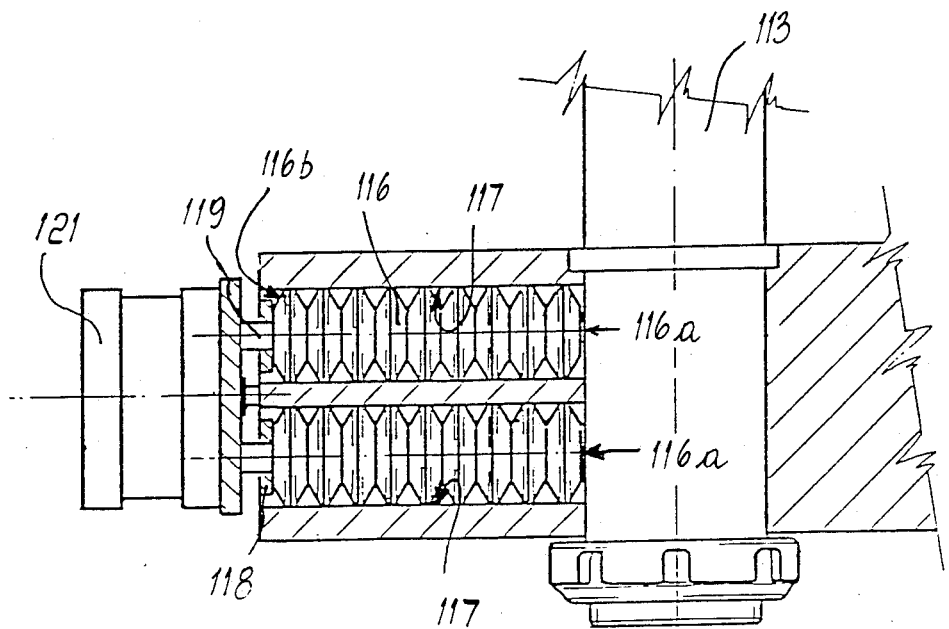

For example, in FIGS. 5-7 is illustrated a machine 101 comprising a frame 102 supporting an horizontal worktable 103.

A head 104 is movable across the worktable in a vertical direction. The head 104 is C-shaped and provided with a first blade 105. The head 104 is operated by a hydraulic cylinder 106 pivoted on the lower side 103a of worktable 103.

Head 104 is guided by guide means 107 affixed to the worktable 103.

The shear force of first blade 105 and of a second blade 108 counterposed to the first blade, is regulated by means of adjustable elastic means 109 according to the thickness of the material to be worked.

The cylinder 106 comprises a body 110, fixed to the horizontal lower projection 104a of head 104, and a stem base 111 fixed to the lower side 103a of the worktable 103 by means of a threaded ring 112.

The guide means 107 comprises at least a pair of parallel cylindrical columns 113, fixed to the worktable 103 and slideable in corresponding through holes 115 with the interposition of antifriction bushes 114.

The holes 115 are bored in the upper horizontal projection 104b of the head 104 at its vertical section 104c.

The adjustable elastic elements 109 comprise a helicoidal spring assembly 116. The springs are disposed horizontally in respective seats 117 and have ends 116a abutting against the lower portion of columns 113. The opposed ends 116b of springs 116, have plates 118 disposed vertically and horizontally movable micrometrically on respective guide pins 119.

FIG. 6 shows springs 116 compressed by means of screws 120 while FIG. 7 shows springs 116 compressed automatically by means of a hydraulic cylinder 121.

The machine operates as follows: a sheet of metal to be sheared is positioned between the first upper blade 105 and the lower blade 108.

Springs 116 are adjusted depending on the thickness of the sheet of metal so that they can provide a maximum stress value for the head 104. The cylinder 106 actuates the head 104 which moves vertically to either shear or punch the sheet of metal.

The required play between the blades 105 and 108 is automatically obtained by the head 104 which is subjected to a bending moment and recovers centesimal plays existing between the bushes 114 and the columns 113 and between the stem 111 of the cylinder 110 and a respective guide bush 122.

This peculiar design of the machine makes the frame 102 and the worktable 103 totally independent, all the elements of the machine 101 being associated to the wortable 103.

Naturally the helicoidal springs 116 are selected with a coefficent of elasticity suitable for the use.

Furthermore all the details may be replaced with other technically equivalent elements.

In practice, the materials employed and the dimensions may be any according to the requirements without thereby abandoning the scope of the protection of the following claims.

I claim:

1. Punching and shearing machine with variable cutting angle comprising a substantially horizontal worktable, guide means associated with said worktable, hydraulic means associated with a lower side of said worktable, a frame supporting said worktable, a head which moves substantially vertically with respect to said worktable, said head being actuated by said hydraulic means and guided by said guide means, said head being substantially C-shaped and having at least one first blade, at least one second blade associated with said worktable, said second blade being counterposed to said first blade for shearing therewith, adjustable elastic means, said head being automatically controlled by said adjustable elastic means for regulating a maximum value of shear force for said first blade and further determining a play between said first blade and said second blade, according to thickness and mechanical resistance of material being processed, wherein said head has an upper extension, said at least one first blade comprising at least two upper blades, said upper extension of said head supporting said at least two upper blades, said at least two upper blades having shearing ends directed towards said worktable, said upper blades being mounted on at least two respective first upper sectors which rotate about a vertical axis, said at least one second blade comprising at least two horizontal lower counter-blades, said at least two horizontal lower counter blades being supported by said worktable by means of at least two second respective lower sectors which rotate about said vertical axis, connection means being provided for connecting said upper sectors with said lower sectors, said connection means thereby allowing for a simultaneous positioning of said upper sectors and said lower sectors, positioning means being provided to position said upper sectors and said lower sectors during a single-step rotation, lower locking means being provided for locking said lower sectors, upper locking means being provided for locking said upper sectors, once a final position has been reached, wherein said connection means comprise at least one pair of vertical prismatic columns which, at a first end, are rigidly coupled to said upper sectors and, at a second end, have hollow seats, said second end being below said worktable, said connection means further comprise at least one pair of supports rigidly associated with said lower locking means, at least one pair of cylindrical head rigidly associated with said supports, said cylindrical heads having tabs with shaped cross sections protruding at a perimeter therefrom, said hollow seats being adapted to accommodate said tabs, and in a rotation configuration, said lower locking means pushing radially on said supports to create a perfect insertion coupling between said tabs and said hollow seats, thereby causing said upper sectors to be rigidly associated with said lower sectors.

2. Machine, according to claim 1, wherein said hydraulic means comprise a cylinder having a base associated with a lower horizontal projection of said head, and furthermore having a piston with a stem, said stem being associated with said lower side of said worktable.

3. Machine according to claim 1, wherein said guide means comprise at least one pair of parallel cylindrical columns associated with said worktable, said head having an upper horizontal projection with through holes bored therein, said through holes being provided with antifriction bearings, said parallel cylindrical columns being slidable inside said antifriction bearings.

4. Machine according to claim 1, wherein said elastic means comprise at least one pair of helicoidal spring assemblies, each helicoidal spring assembly of said at least one pair of helcoidal spring assemblies comprising a spring being disposed horizontally in a respective seat, a vertical plate being micrometrically movable on a respective guide pin, said spring having a first end abutting against a lower portion of said guide means and having a second end in contact with said vertical plate, said each helicoidal spring assembly further comprising compressing means acting on said guide pin.

5. Machine, according to claim 4, wherein said compressing means comprise a screw associated with said guide pin.

6. Machine, according to claim 4, wherein said compressing means comprise a hydraulic cylinder associated with said guide pin.

7. Machine, according to claim 1, wherein said lower locking means comprise at least one pair of hydraulic cylinders positioned in related seats located below said lower sectors, each said hydraulic cylinder having a stem which is provided with an articulation, said articulation being coupled to an upper end of a rocker, said rocker having a lower end being substantially J-shaped and having a horizontal portion which, when said each said hydraulic cylinder is actuated, makes locking contact with a lower face of said worktable.

8. Machine, according to claim 1, wherein said upper locking means comprise at least one pair of cylinders associated with said upper extension of said head, said cylinders being provided with stems which protrude substantially vertically beneath said upper extension of said head, said stems supporting substantially horizontal flanges which compress and lock said upper sectors against said upper extension of said head.

9. Punching and shearing machine with variable cutting angle comprising a substantially horizontal worktable, guide means associated with said worktable, hydraulic means associated with a lower side of said worktable, a frame supporting said worktable, a head which moves substantially vertically with respect to said worktable, said head being actuated by said hydraulic means and guided by said guide means, said head being substantially C-shaped and having at least one first blade, at least one second blade associated with said worktable, said second blade being counterposed to said first blade for shearing therewith, adjustable elastic means, said head being automatically controlled by said adjustable elastic means for regulating a maximum value of shear force for said first blade and for further determining a play between said first blade and said second blade, according to thickness and mechanical resistance of material being processed, wherein said head has an upper extension, said at least one first blade comprising at least two upper blades, said upper extension of said head supporting said at least two upper blades, said at least two upper blades having shearing ends directed towards said worktable, said upper blades being mounted on at least two respective first upper sectors which rotate about a vertical axis, said at least one second blade comprising at least two horizontal lower counter-blades, said at least two horizontal lower counter blades being supported by said worktable by means of at least two second respective lower sectors which rotate about said vertical axis, connection means being provided for connecting said upper sectors with said lower sectors, said connection means thereby allowing for a simultaneous positioning of said upper sectors and said lower sectors, positioning means being provided to position said upper sectors and said lower sectors during a single-step rotation, lower locking means being provided for locking said lower sectors, upper locking means being provided for locking said upper sectors, once a final position has been reached, wherein said lower locking means comprise at least one pair of hydraulic cylinders positioned in related seats located below said lower sectors, each said hydraulic cylinder having a stem which is provided with an articulation, said articulation being coupled to an upper end of a rocker, said rocker having a lower end being substantially J-shaped and having a horizontal portion which, when said each said hydraulic cylinder is actuated, makes locking contact with a lower face of said worktable.

10. Machine, according to claim 9, wherein said hydraulic means comprise a cylinder having a base associated with a lower horizontal projection of said head, and furthermore having a piston with a stem, said stem being associated with said lower side of said worktable.

11. Machine according to claim 9, wherein said guide means comprise at least one pair of parallel cylindrical columns associated with said worktable, said head having an upper horizontal projection with through holes bored therein, said through holes being provided with antifriction bearings, said parallel cylindrical columns being slidable inside said antifriction bearings.

12. Machine according to claim 9, wherein said elastic means comprise at least one pair of helicoidal spring assemblies, each helicoidal spring assembly of said at least one pair of helicoidal spring assemblies comprising a spring being disposed horizontally in a respective seat, a vertical plate being micrometrically movable on a respective guide pin, said spring having a first end abutting against a lower portion of said guide means and having a second end in contact with said vertical plate, said each helicoidal spring assembly further comprising compressing means acting on said guide pin.

13. Machine according to claim 12, wherein said compressing means comprise a screw associated with said guide pin.

14. Machine, according to claim 12, wherein said compressing means comprise a hydraulic cylinder associated with said guide pin.

15. Machine according to claim 9, wherein said connection means comprise at least one pair of vertical prismatic columns which, at a first end, are rigidly coupled to said upper sectors and, at a second end, have hollow seats, said second end being below said worktable, said connection means further comprise at least one pair of supports rigidly associated with said lower locking means, at least one pair of cylindrical heads rigidly associated with said supports, said cylindrical heads having tabs with shaped cross sections protruding at a perimeter therefrom, said hollow seats being adapted to accommodate said tabs, and in a rotation configuration, said lower locking means pushing radially on said supports to create a perfect insertion coupling between said tabs and said hollow seats, thereby causing said upper sectors to be rigidly associated with said lower sectors.

16. Machine, according to claim 9, wherein said upper locking means comprise at least one pair of cylinders associated with said upper extension of said head, said cylinders being provided with stems which protrude substantially vertically beneath said upper extension of said head, said stems supporting substantially horizontal flanges which compress and lock said upper sectors against said upper extension of said head.

* * * * *